(12) United States Patent
Calvet

(10) Patent No.: US 7,555,210 B2
(45) Date of Patent: Jun. 30, 2009

(54) AXIAL SNUBBERS FOR CAMERA

(75) Inventor: Robert J. Calvet, Pasadena, CA (US)

(73) Assignee: Siimpel, Inc., Arcadia, CA (US)

( * ) Notice: Subject to any disclaimer, the term of this patent is extended or adjusted under 35 U.S.C. 154(b) by 428 days.

(21) Appl. No.: 11/269,304

(22) Filed: Nov. 8, 2005

(65) Prior Publication Data

US 2006/0193618 A1 Aug. 31, 2006

Related U.S. Application Data

(60) Provisional application No. 60/657,261, filed on Feb. 28, 2005.

(51) Int. Cl.
*G03B 17/00* (2006.01)
*G03B 3/00* (2006.01)
*G02B 7/02* (2006.01)

(52) U.S. Cl. .............................. 396/79; 396/89; 359/823

(58) Field of Classification Search ................. 310/309; 359/811, 812, 818–820, 823, 824; 396/72, 396/79, 83, 89, 529, 530, 535; 33/1 M; 348/373–376
See application file for complete search history.

(56) References Cited

U.S. PATENT DOCUMENTS

| 4,860,040 | A | * | 8/1989 | Tamamura et al. ............ 396/89 |
| 5,150,260 | A | * | 9/1992 | Chigira ....................... 359/694 |
| 2002/0070634 | A1 | * | 6/2002 | Tai et al. ..................... 310/309 |
| 2003/0048036 | A1 | * | 3/2003 | Lemkin ...................... 310/309 |
| 2004/0189969 | A1 | * | 9/2004 | Mizuno ........................ 355/67 |
| 2004/0201773 | A1 | * | 10/2004 | Ostergard ................... 348/374 |
| 2005/0007489 | A1 | * | 1/2005 | Ahn et al. ................... 348/375 |

* cited by examiner

Primary Examiner—W. B. Perkey
Assistant Examiner—Minh Phan
(74) Attorney, Agent, or Firm—Haynes & Boone, LLP.

(57) ABSTRACT

A method and system for limiting the motion of items, such as camera optics, are disclosed. A motion limiting member can be used to limit the motion of the item using a surface thereof that abuts a structure of the item. Limits on the motion can be defined by a positioning member that is attached to the motion limiting member and that abuts a structure that is fixed with respect to the desired range of motion of the item whose motion is being limited. This abutment facilitates the precise definition of the limit on the motion of the item.

12 Claims, 9 Drawing Sheets

AXIAL SNUBBERS FOR CAMERA

PRIORITY CLAIM

This patent application claims the benefit of the priority date of U.S. provisional patent application Ser. No. 60/657,261, filed on Feb. 28, 2005 and entitled AUTOFOCUS CAMERA pursuant to 35 USC 119. The entire contents of this provisional patent application are hereby expressly incorporated by reference.

TECHNICAL FIELD

The present invention relates generally to cameras. The present invention relates more particularly to an axial snubber assembly for limiting the motion of optical elements in a miniature camera, such as a miniature camera that is suitable for use in a cellular telephone.

BACKGROUND

Miniature cameras are well known. Miniature cameras are widely used in contemporary cellular telephones. They are also used in other devices, such as laptop computers and personal digital assistants (PDAs). Miniature cameras can even be used as stand alone devices for such applications as security and surveillance.

Contemporary miniature cameras, such as those used in cellular telephones, are fixed focus cameras. That is, the focus of the cameras is preset. The camera has a small enough aperture so as to provide sufficient depth of field such that focus is generally acceptable over a wide range of distances. However, such stopping down of the camera severely limits its use in low light conditions. It also limits resolution by inhibiting the use of higher pixel counts. Larger apertures allow higher pixel counts, but require the use of variable focus in order to obtain the desired depth of field.

Variable focus necessitates the use of movable optics. However, movable optics suffer from inherent disadvantages. Foremost among these disadvantages is the size of the mechanisms required to effect and control movement of the movable optics. For example, the structures used to control the movement of optics in larger cameras are simply too large for use in many miniature cameras. As such, it is desirable to provide miniature structures for controlling motion in miniature cameras.

BRIEF SUMMARY

A method and system for controlling, i.e., limiting, the motion of miniature components, such as the optics of a camera, are disclosed. The system can comprise a motion limiting member that limits the motion of a component and also a positioning member attached to the motion limiting member that determines a position of the motion limiting member. That is, the positioning member can determine where the motion limiting member is located and thus can determine how motion of the component is limited.

For example, the motion limiting member can comprise a surface that abuts a structure of camera optics to limit the motion of the camera optics. In this manner, lenses that focus and/or zoom a camera can be limited in travel to the extent necessary for desired functioning of the camera. Also, excessive movement of the optics, that may cause damage if permitted, can be inhibited.

According to one embodiment of the present invention, the positioning member is defined by an elongated U-shaped structure. The elongated U-shaped structure attaches to a fixed portion of a camera. The elongated U-shaped structure has motion limiting members that extend therefrom such that stops defined by surfaces at the ends thereof abut a structure of the camera optics to halt movement of the camera optics at the desired ends of their range of travel. Two opposed axial snubber can thus be used to define the range of travel for focus and/or zoom lenses or the like.

According to one embodiment of the present invention, the snubbers limit the motion of optics of a miniature camera that utilize comparatively brittle silicon structures. The snubbers can be formed from a plastic material that is substantially more resilient than silicon. When a structure of the lens assembly contacts the stops of the axial snubbers, contact with the silicon structures is avoided and consequently no damage typically results. That is, use of the axial snubber mitigates undesirable contact with or stress upon the more fragile components and thus reduces the likelihood of undesirable damage thereto.

This invention will be more fully understood in conjunction with the following detailed description taken together with the following drawings.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION OF THE INVENTION

A method and system for defining the motion of an item is disclosed. For example, according to one embodiment of the present invention, the axial (along the direction of the optical axis) motion of camera optics can be limited. In this manner, axial motion of the camera optics can be restricted to a range that is consistent with desired operation of the camera and which mitigates the likelihood of damage to the camera. For example, one snubber can be configured so as to make one end of the range of focus at infinity and/or another snubber can be configured so as to make the other end of the range of focus the closest focus.

More particularly, the motion of optics that facilitates focus and/or zoom of a camera can be limited. Such limiting of the motion of camera optics can be particularly beneficial when micro-electromechanical systems (MEMS) components are used to move the camera optics. Such MEMS components can be fragile. For example, such MEMS components can be formed of a comparatively brittle material, such as silicon. If such fragile components are permitted to contact structures with too much force, damage to the camera can result.

Thus, according to one aspect of the present invention, axial snubbers are provided to inhibit contact of fragile components that may result in damage thereto. The axial snubbers are formed of a more resilient and durable material such that damage is not likely when contact is made therewith.

Moreover, according to one embodiment of the present invention, a lateral snubber assembly inhibits undesirable lateral movement (as defined in FIG. 8) of camera optics, while axial snubbers limit undesirable axial movement of the camera optics.

According to one or more aspects, the present invention includes a system and method for providing a combination of precision positioning and high shock capability. This is accomplished by, among other things, providing axial snubbers that are designed such that they do not plastically deform under shock, but rather elastically deform under shock as discussed in detail below.

Figure 1:
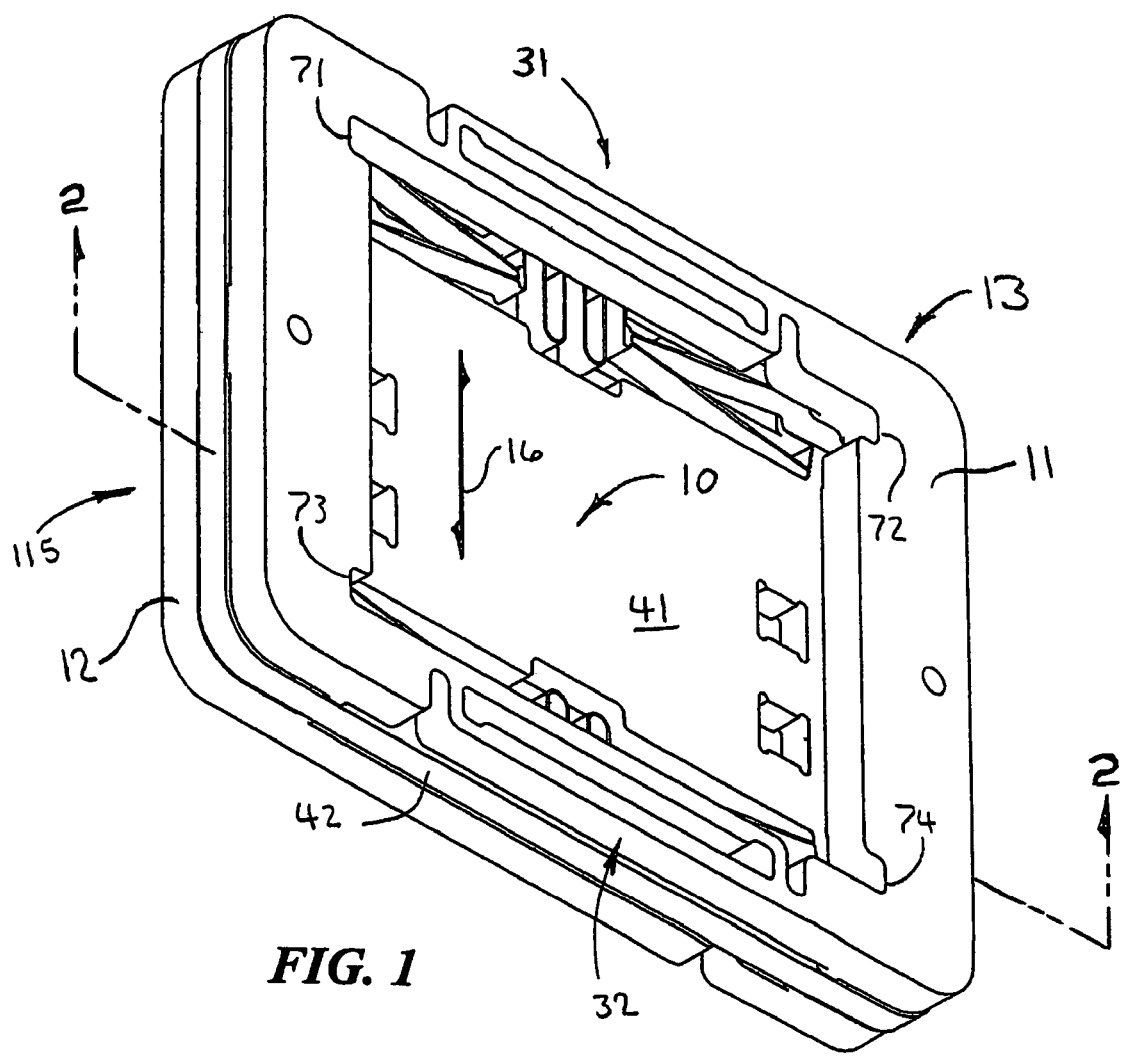
FIG. 1 is perspective top view of a stage and lateral snubber assembly according to an exemplary embodiment of the present invention.
Figure 2:
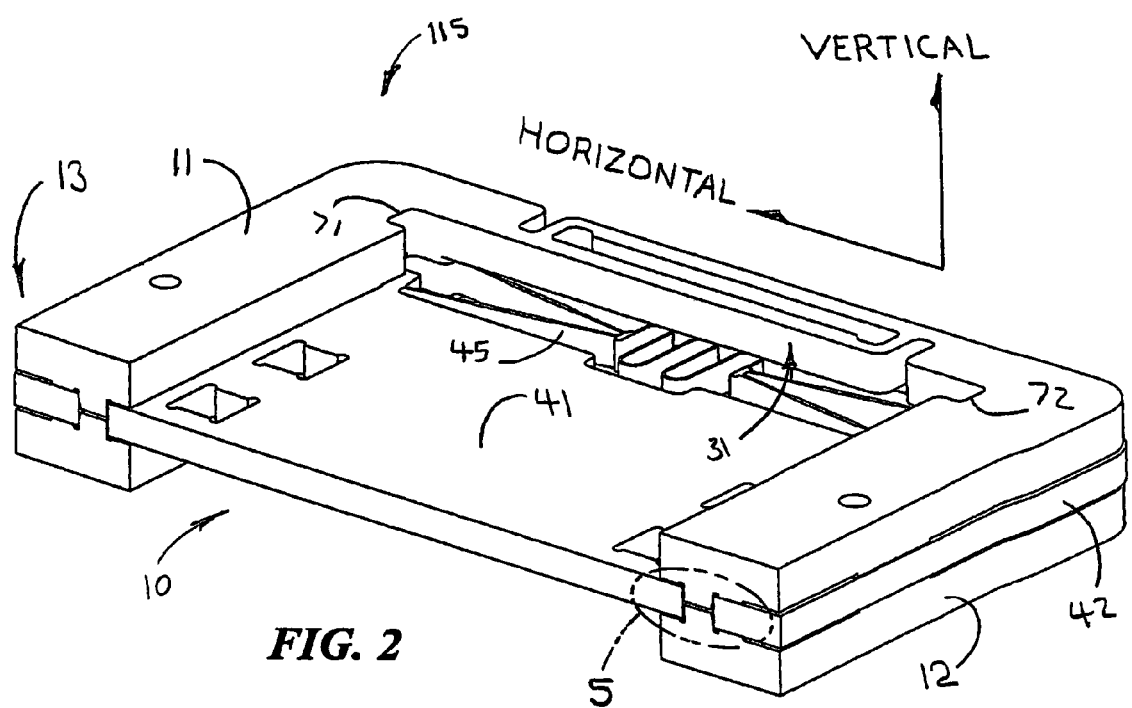
FIG. 2 is a top perspective cross-sectional view of the stage and lateral snubber assembly taken along line 2 of FIG. 1.

Referring now to FIGS. 1 and 2, a stage assembly 10 (better shown in FIG. 5) is sandwiched between two portions, 11 and 12 (better shown in FIGS. 3 and 4), of a lateral snubber assembly 13, according to one embodiment of the present invention. The stage assembly 10 and the lateral snubber assembly 13 can be generally planar structures, formed from silicon, for instance. Stage assembly 10 and/or lateral snubber assembly 13 can alternatively be formed from another material, such as plastic or metal.

Figure 5:
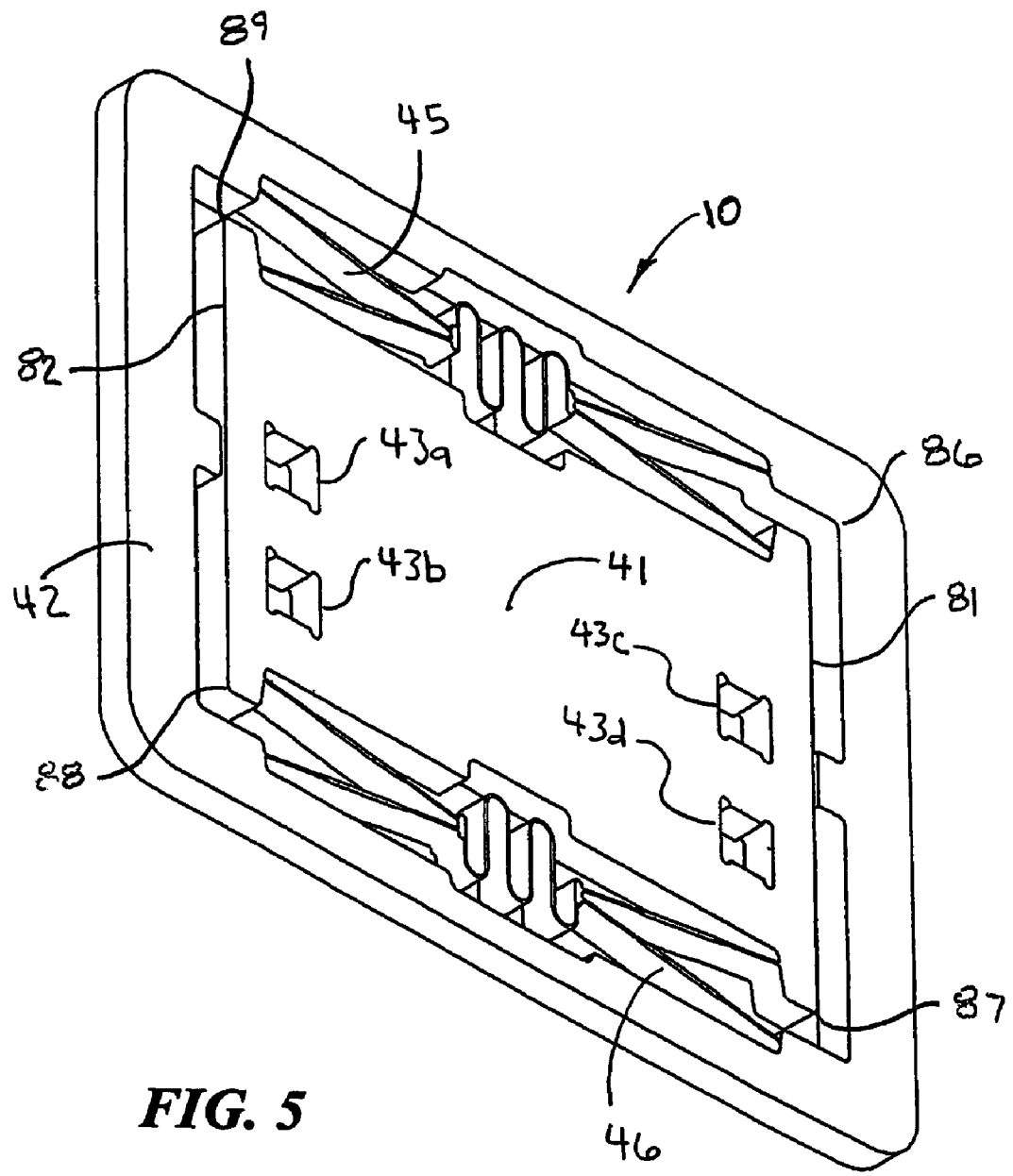
FIG. 5 is a top or bottom (both are identical) perspective view of the stage assembly of FIG. 1.

Stage assembly 10 comprises a stage 41 that moves back-and-forth, so as to facilitate movement of optics for focusing and/or zooming, for example. Stage assembly 10 further comprises a frame 42 that generally surrounds stage 41 (as best seen in FIG. 5). Frame 42 is fixed in position with respect to lateral snubber assembly 13 and thus does not move. Arrow 16 shows the back-and-forth directions of motion of stage 41 with respect to frame 42 (better shown in FIG. 5) and with respect to lateral snubber assembly 13. Lateral snubber assembly 13 facilitates such back-and-forth motion of stage 41 while substantially inhibiting all other motions of stage 41.

Figure 3:
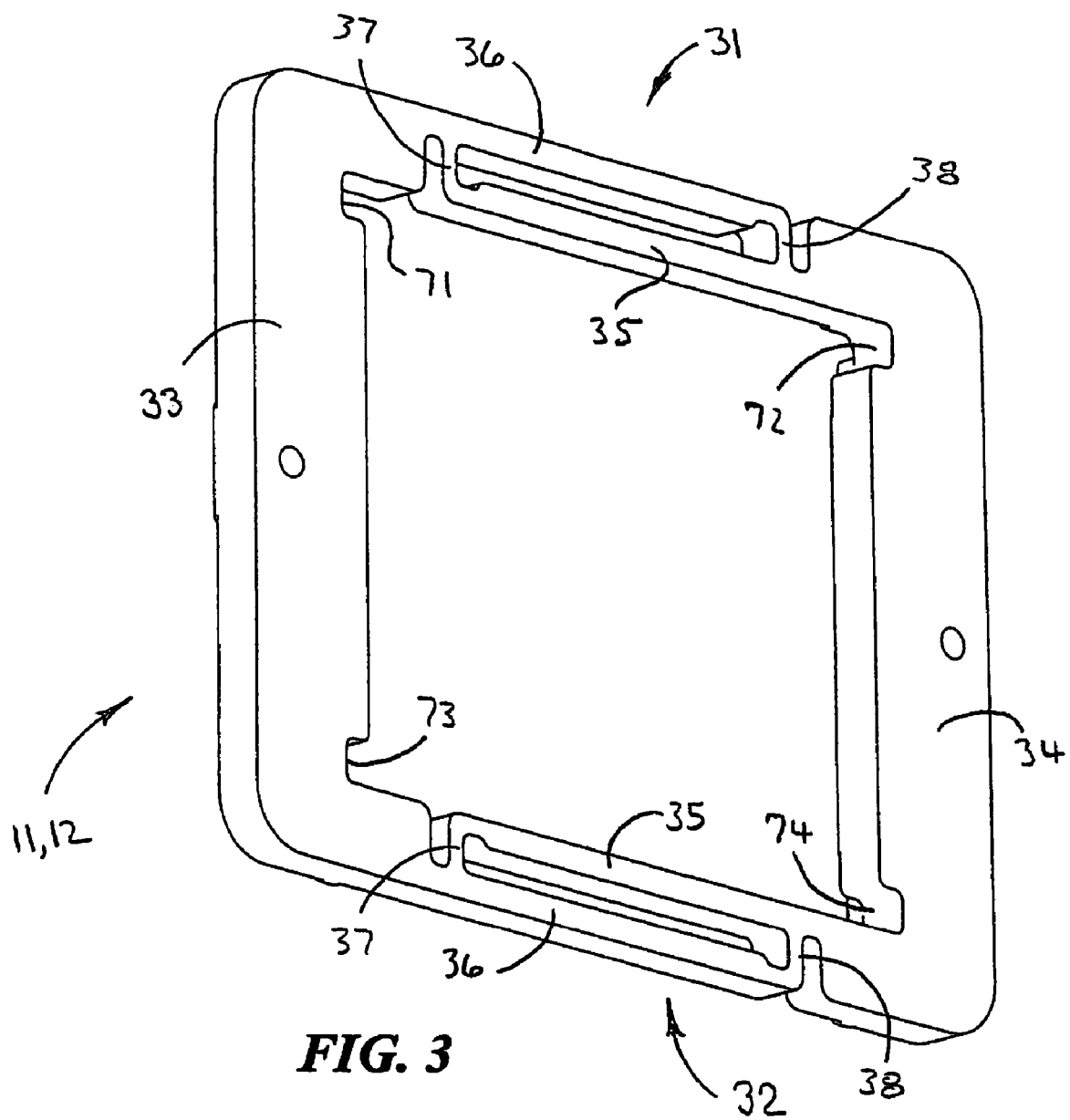
FIG. 3 is an outboard perspective view of a lateral snubber portion of FIG. 1.
Figure 4:
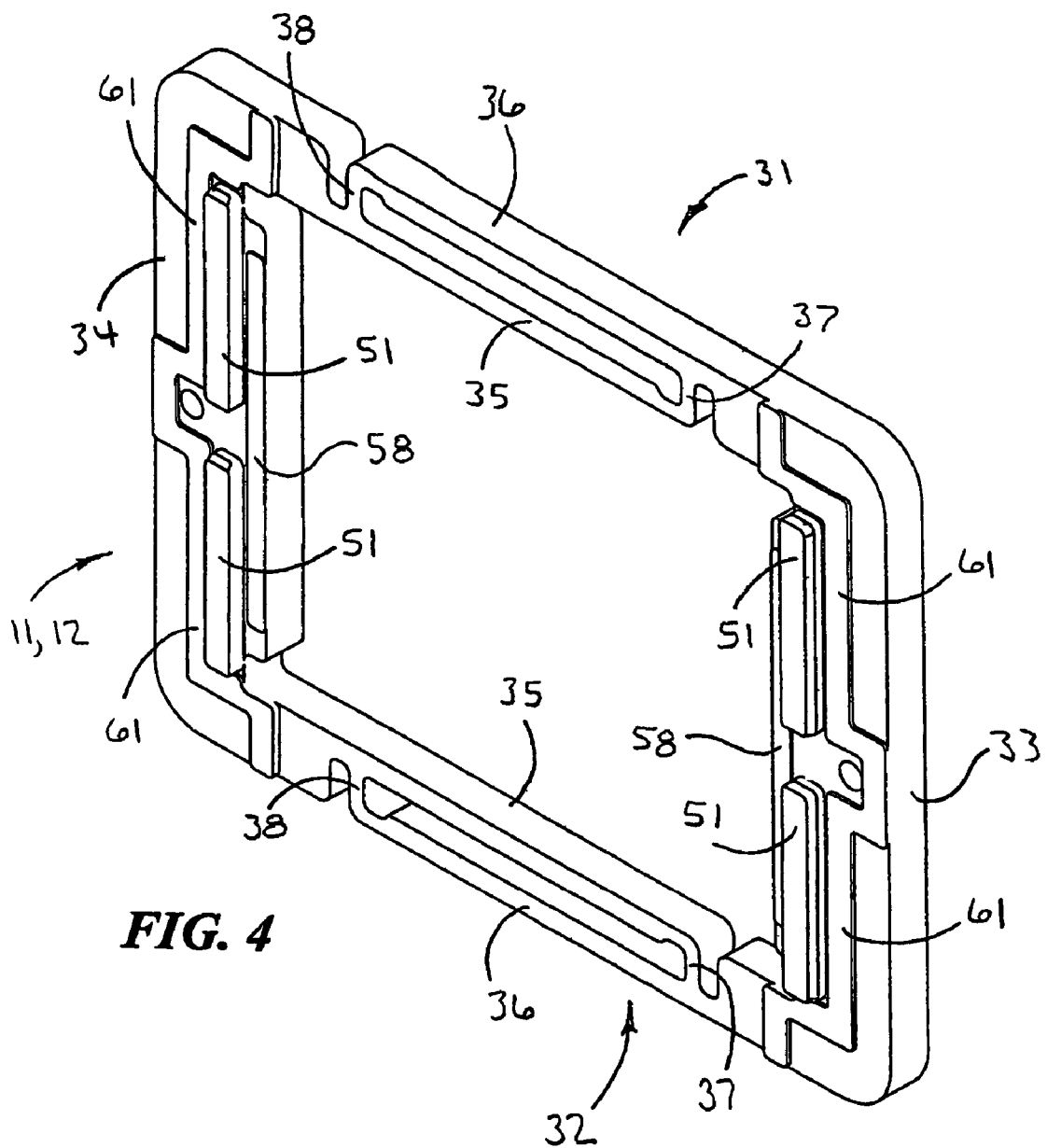
FIG. 4 is an inboard perspective view of the lateral snubber portion of FIG. 3.
Figure 6:
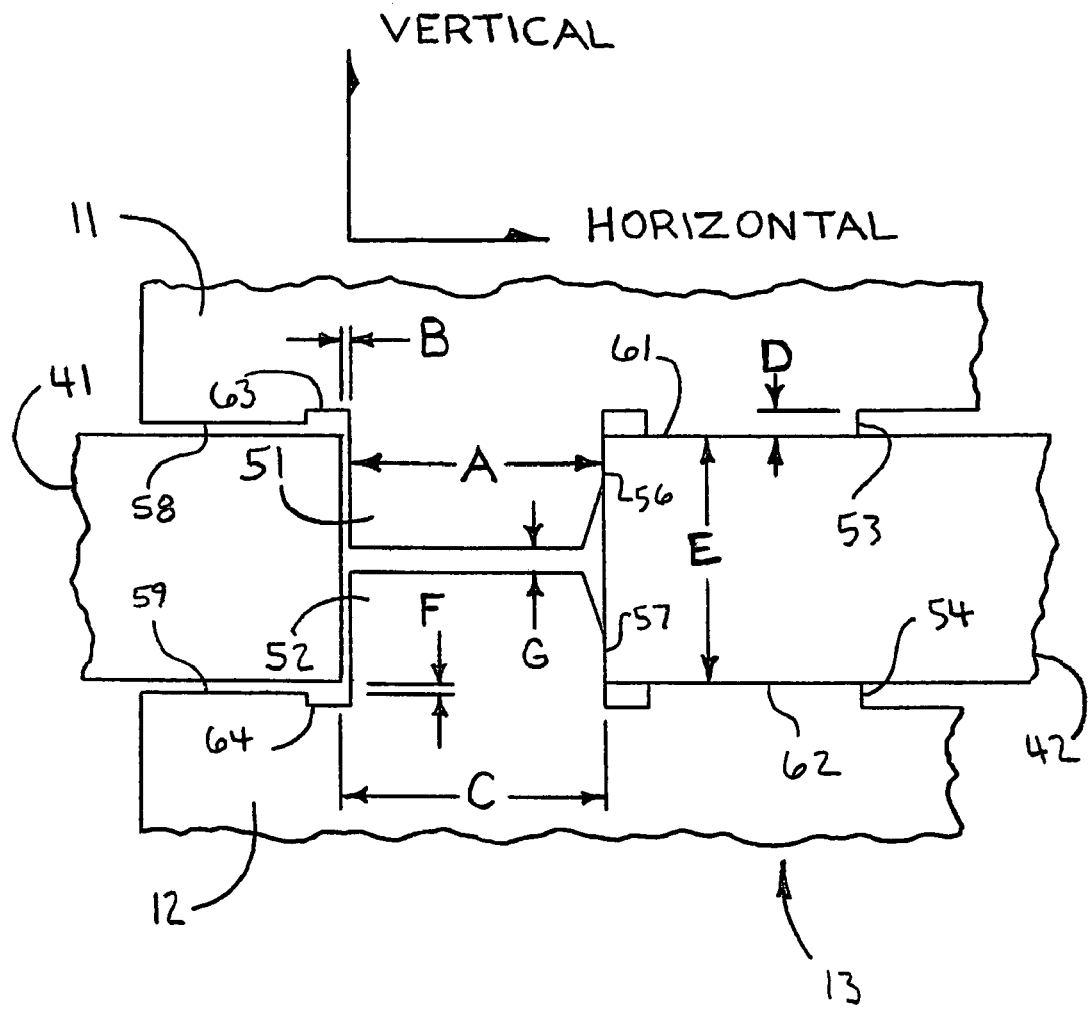
FIG. 6 is an enlarged fragmentary view of the interface of the top lateral snubber, the bottom lateral snubber, and the stage, taken within line 5 of FIG. 2.

Referring now to FIGS. 3 and 4, each portion 11, 12 of lateral snubber assembly 13 can be a generally planar and generally rectangular structure. Lateral snubber assembly 13 can comprise two biasing members 31 and 32 that function as springs to bias two sides 33 and 34 outwardly, so as to cause them to contact portions (surfaces 56 and 57 as shown in FIG. 6) of frame 42 in a manner that advantageously positions critical features of lateral snubber assembly 13, as discussed in detail below. Alternatively, the inherent resiliency of lateral snubber assembly 13 can effect such biasing.

Each biasing member 31, 32 can comprise an inboard member 35, an outboard member 36, and two side members 37 and 38 that are configured to cooperate so as to provide spring tension that moves the sides 33 and 34 outwardly after sides 33, 34 have been pushed inwardly (such as when stage assembly 10 is being installed therebetween). That is, the rectangle defined by an inboard member 35, an outboard member 36, and two side members 37 and 38 can deform so as to define a parallelogram that provides spring tension. Each portion 11, 12 of lateral snubber assembly 13 further comprises structural features that cooperate with stage assembly 10 to define tolerances or spacings between lateral snubber assembly 13 and stage 41, as discussed in detail with reference to FIG. 6 below.

With particular reference to FIG. 4, each portion 11, 12 of lateral snubber assembly 13 may have formed upon an inboard (lateral snubber assembly 10 contacting) surface thereof a plurality of mesas 51, shims 61, and stops 58, the functions of which are discussed in detail with reference to FIG. 6 below. The mesas may optionally be formed upon only one portion, 11 or 12, of the later snubber assembly.

Referring now to FIG. 5, stage assembly 10 comprises a movable portion or stage 41 and a fixed portion or frame 42. Stage 41 can be a generally planar, generally rectangular structure. Optics are attachable, either directly or indirectly, to stage 41.

Stage 41 can move in response to a motor or actuator, such as to effect focusing and/or zooming. For example, an optics assembly (not shown) can be attached to stage 41 via apertures 43a-43d.

Frame 42 can similarly be a generally planar and generally rectangular structure that can substantially surround a periphery of stage 41. Frame 42 can be movably attached to stage 41 via flexure assemblies 45 and 46. Flexure assemblies 45 and 46 can preferentially facilitate movement of stage 41 in one desired translational degree of freedom, i.e., in the back-and-forth directions of arrow 16 of FIG. 1. Lateral snubber assembly 13 can limit movement of stage 41 that is beyond the one desired translation degree of freedom.

Stage 41, as well as frame 42, lateral snubber assembly 13, and other components of the present invention, can be of any desired shape and/or configuration. Stage assembly 10 can be formed monolithically, such as via the etching or milling of a single piece of silicon or other material. Similarly, lateral snubber assembly 13 can also be formed monolithically. Alternatively, stage assembly 10 and/or lateral snubber assembly 13 can be formed in any other desired manner using any desired material. Indeed, the reduced precision needed by lateral snubber assembly 13 according to one aspect of the present invention allows lateral snubber assembly 13 to be formed of plastic using low a precision manufacturing process.

Lateral snubber assembly 13 defines limits to movement of stage 41, so as to inhibit movement in five other degrees of freedom for which it is desirable to restrict movement of stage 41. Such limitations on the movement of stage 41 tend to maintain desired alignment of components, such as optics. The limitations are also desirable, for example, in the event of shock or vibration that would other cause stage 41 to move in a manner that may cause damage to itself or other components, e.g., lenses of a camera. Thus, the stage, and consequently the camera optics, can be permitted to move in a manner that facilitates desired functionality, e.g., focusing and/or zooming, while also being restrained in a manner that mitigates undesirable malfunctioning (misalignment of optics) and damage.

Referring now to FIG. 6, exemplary structures of stage assembly 10 and lateral snubber assembly 13 that limit motion of stage 41 in five degrees of freedom while facilitating substantially more motion in a sixth degree of freedom (as indicated by arrow 16 in FIG. 1) are shown. Each portion 11, 12 of lateral snubber assembly 13 comprises features such as mesas 51, 52, shims 53, 54, and stops 58, 59 that define limits to the movement of stage 41 in five degrees of freedom while permitting unrestricted movement of stage 41 in one degree of freedom.

Mesas 51, 52, shims 53, 54, and stops 58, 59 are formed precisely. They are also precisely positioned by keying to or abutting precisely formed portions of frame 42, so that they are, in-turn, precisely positioned themselves and are thus suitable for defining limits to the movement of stage 41.

In this manner, the limits to the movement of stage 41 can be defined with greater precision than the precision with which the overall lateral snubber assembly 13 is manufactured because the lateral snubber assembly 13 cooperates with the frame 42 of the stage assembly 10 to define positioning of the structures that limit motion of stage 41 and because frame 42 is manufactured with sufficient precision so as to facilitate such definition of these positions.

More particularly, the width, Dimension A, of each mesa 51, 52 together with the distance between stage 41 and frame 42, Dimension C, defines the size of the horizontal gap, Dimension B, between stage 41 and lateral snubber assembly 13. Since the width of each mesa 51, 52, Dimension A, and the distance between the stage 41 and the frame 42, Dimension C, can be easily controlled, the horizontal gap, Dimension B, can likewise be easily controlled. The distance between the stage 41 and frame 42, Dimension C, is controlled by precisely manufacturing the overall dimensions of stage assembly 10. The width of mesa 51, 52 only requires precision in the manufacturing of a comparatively small portion of the lateral snubber assembly 13, i.e., each mesa 51, 52 itself. It does not require that the position of each mesa 51, 52 be precisely determined during manufacturing of lateral snubber assembly 13.

Positioning of each mesa 51, 52 is determined by its contact with frame 42 at surfaces 56 and 57. Contact at surfaces 56 and 57 is effected by the outward biasing of side members 33 and 34 of each portion 11, 12 of lateral snubber assembly, as described above. Since frame 42 of lateral snubber assembly 13 is manufactured with precision, this contact point is precisely located. Thus, the size of the horizontal gap, Dimension B, between the stage 41 and the lateral snubber assembly 13 can be controlled without requiring that the overall manufacturing tolerances of lateral snubber assembly 13 be precise.

Similarly, the thickness, Dimension D, of each shim 53, 54 together with the thickness, Dimension E, of frame 42, defines the size of each horizontal gap, such as Dimension F, between stage 41 and the stops 58, 59 of lateral snubber assembly 13. Shims 53, 54 contact frame 42 at surfaces 61, 62 thereof. This contact is effected by attachment of the upper portion 11 to the lower portion 12 of lateral snubber assembly 13 by any desired means, such as by adhesive bonding. There are two such vertical gaps on each of the two sides of stage 41. On each side of stage 41, one vertical gap is above stage 41 and one vertical gap is below stage 41. Since the thickness, Dimension D, of each shim 53, 54, and the thickness, Dimension E, of frame 42 can be precisely controlled, each vertical gap, Dimension F, can also be precisely controlled. The thickness, Dimension D, of each shim can be controlled by precisely manufacturing a small portion of the lateral snubber assembly 13. The thickness, Dimension E, of frame 42 can be precisely controlled during manufacture thereof. As with the horizontal gap, Dimension B, the distance between stage 41 and frame 42 defining each one of the vertical gaps, such as Dimension F, is controlled by precisely manufacturing the overall dimensions of stage assembly 10. The thickness, Dimension D, of shims 53, 54 only requires precision in the manufacturing of a comparatively small portion of lateral snubber assembly 13, i.e., each shim 53, 54 itself. Again, it does not require that the position of each shim 53, 54 be precisely determined during manufacturing of lateral snubber assembly 13.

It is worthwhile to note that a vertical gap, Dimension G, is provided between mesas 51 and 52 to insure that they do not contact one another and thereby interfere with proper positioning of shims 53 and 54 (and consequently with the definition of the vertical gaps between stage 41 and lateral snubber assembly 13, such as Dimension F). The size of the vertical gap, Dimension G, is not crucial.

For example, Dimension A can be approximately 300 microns, Dimension B can be approximately 10 microns, Dimension C can be approximately 310 microns, Dimension D can be approximately 25 microns, Dimension E can be approximately 300 microns, Dimension F can be approximately 10 microns, and Dimension G can be approximately 25 microns. However, as those skilled in the art will appreciate, various other values for these dimensions are likewise suitable and the dimensions used will depend upon the specific application.

Thus, only the mesas 51, 52, shims 53, 54 and stops 58, 59 of lateral snubber assembly 13 need be precisely manufactured. These are comparatively small portions of lateral snubber assembly 13 and can thus be precisely manufactured with relative ease. The overall dimensions of lateral snubber assembly 13 do not require such precision. Moreover, according to one aspect of the present invention, close tolerances (Dimensions B and F, for example) between the stage 41 and the lateral snubber assembly 13 are obtained without requiring that the larger dimensions of lateral snubber assembly be precisely controlled.

Rather, the larger dimensions of stage assembly 10 are controlled, as well as the smaller dimensions of critical structures of lateral snubber assembly 13 that cooperate with stage assembly 10 to determine the dimensions of critical gaps therebetween (such as Dimensions B and F). In this manner, the manufacturing process of the stage and the lateral snubber assembly of the present invention is simplified and the cost thereof is mitigated.

Optionally, channels 63 and 64 are formed in upper 11 and lower 12 portions of lateral snubber assembly 13. Channels 63 and 64 mitigate the likelihood of edges 81 and 82 (FIG. 5) of stage 41 contacting upper 11 and lower 12 portions of lateral snubber assembly 13 and causing damage to stage 41 and/or lateral snubber assembly 13.

Similarly, cutouts 71-74 (best shown in FIG. 3) can be formed in upper 11 and lower 12 portions of lateral snubber assembly 13 to inhibit corners 86-89 (FIG. 5) from contacting upper 11 and lower 12 portions of lateral snubber assembly 13 and causing damage to stage 41 and/or lateral snubber assembly 13.

In operation, stage 41 can move substantially in one translational degree of freedom, as indicated by arrow 16 of FIG. 1. For example, optics mounted to stage 41 can be moved in these directions to effect focusing and/or zooming of a camera. Such movement of stage 41 results in compression of one set of flexures (such as flexures 45 of FIG. 5), while simultaneously resulting in expansion of the other set of flexures (such as flexures 46 of FIG. 5). The amount of movement along this one degree of freedom is limited by the configuration of flexures 45, 46 and by the size of frame 42, not by lateral snubber assembly 13.

It is also worthwhile to note that the stage and the lateral snubber assembly of the present invention can be configured such that during normal operation stage 41 does not contact lateral snubber assembly 13. Thus, the snubbing action that can be provided by mesas 51, 52 and stops 58, 59 can be for extraordinary circumstances, such as when the device is accidentally dropped.

Movement in the five restricted degrees of freedom is comparatively limited. Translation of stage 41 from side-to-side (toward and away from mesas 51, 52) is limited by mesas 51, 52. That is, when stage 41 moves from side-to-side by an amount greater than Dimension B, it contacts mesas 51, 52, which restrict its motion. Translation of stage 41 up and down (toward and away from stops 58, 59) is similarly limited by stops 58, 59. All rotations of stage 41 are limited by either mesas 51, 52 or stops 58, 59.

Figure 7:
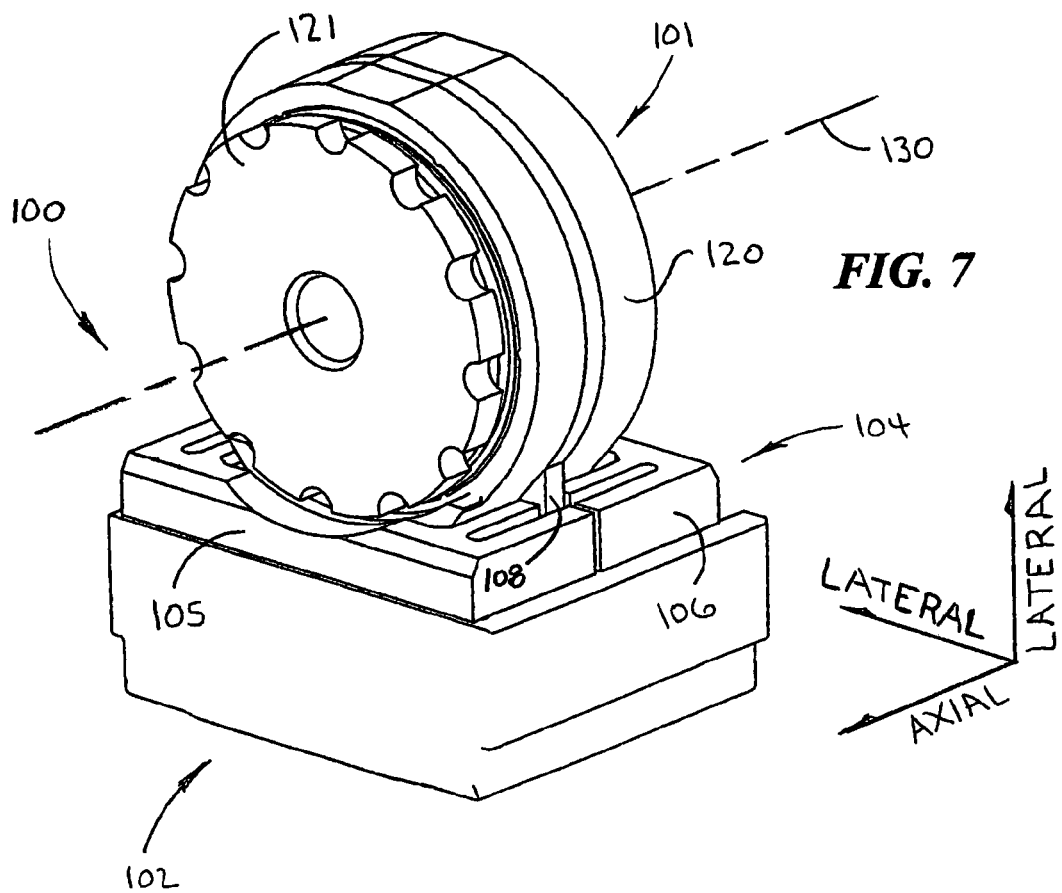
FIG. 7 is a front perspective view of an optics assembly mounted to an actuator, wherein axial snubbers are provided to limit axial motion of the optics assembly according to one embodiment of the present invention.

Referring now to FIG. 7, an optics and actuator assembly 100 provides components of a miniature camera that are suitable for use in portable electronic items, such as cellular telephones, personal digital assistants (PDAs), laptop computers, notebook computers, and the like. These camera components are also suitable for use in stand-alone cameras that can be used for security and surveillance.

Optics and actuator assembly 100 comprises optics assembly 101 and actuator assembly 102. Optics assembly 101 can comprise focus and/or zoom optics which are moved so as to facilitate focusing and/or zooming of a miniature camera. Actuator assembly 102 can comprise a motor or actuator that effects movement of optics assembly 101 so as to facilitate such focusing and/or zooming.

Movement of optics assembly 101 should be constrained, so that optics assembly 101 functions properly to provide focus and/or zoom. That is, movement of optics assembly 101 should only be substantial along the axial direction, as needed to perform focusing and/or zooming. Movement in the lateral directions is undesirable, since in tends to degrade performance of the camera. Movement in the axial direction should be limited, since only a limited amount of motion is required to perform the desired functions and since excessive motion can cause damage to the camera.

The axial direction, as defined herein, is a direction that is substantially parallel to an optical axis 130 of optics assembly 101. Lateral directions are directions that are substantially perpendicular to the axial direction. Thus, lateral directions include the direction of side-to-side movement of optics assembly 101 and the direction of up-and-down movement of optics assembly 101, as indicated by the arrows in FIG. 7.

Optical assembly 101 includes a ring mount 120 and a lens holder 121. Lens holder 121 is received within ring mount 120 and can be adjustably attached thereto, such as via threads. Ring mount 120 is attached to stage 41. Axial snubber assembly 104 comprises axial snubbers 105 and 106. Axial snubbers 105 and 106 cooperate to limit axial motion of optics assembly 101, as described in detail below.

Axial snubbers 104 and 105 are configured such that they do not plastically deform under shock, but rather elastically deform under shock. That is, the shape of axial snubbers 105 and 106 and the material used in the construction thereof facilitate such elastic deformation. Thus, as described herein, the present invention provides a system and method for providing a combination of precision positioning and high shock capability.

Because of such elastic deformation, snubbers 104 and 105 provide two ranges of motion. A first range of motion is provided under normal operating conditions (non-shock operation) wherein snubbers 104 and 105 do not deform. A second range of motion is provided under shock conditions wherein snubbers 104 and 105 do deform. The second range of motion is greater than the first range of motion. Shock can provide forces that cause snubbers 104 and 105 to elastically deform. This elastic deformation allows optical elements to move further under shock than during normal operation. However, since snubbers 104 and 105 elastically deform instead of plastically deform, they return to approximately their original configuration after a shock.

Such elastic deformation allows both the first and second ranges of motion to tend to remain substantially constant before and after a shock. This consistency of the two ranges of motion tends to insure proper functioning of the camera, since it tends to maintain desired limits on the motion of optical elements. Since the first range of motion defines the limits on motion with respect to normal operation, it is desirable that the first range of motion not change substantially due to shock. In this manner, the extremes of travel of optical elements remains generally constant over time. For, example, the positions of lenses at infinity focus and at closest focus can remain generally constant.

Since the second range of motion defines the limits on motion with respect to movement due to a shock, it is also desirable that the second range motion be substantially constant from shock to shock. For example, it would be undesirable for the second range of motion to increase after a shock. The resultant excessive movement of optical elements due to subsequent shocks could then result to damage to the camera.

Figure 8:
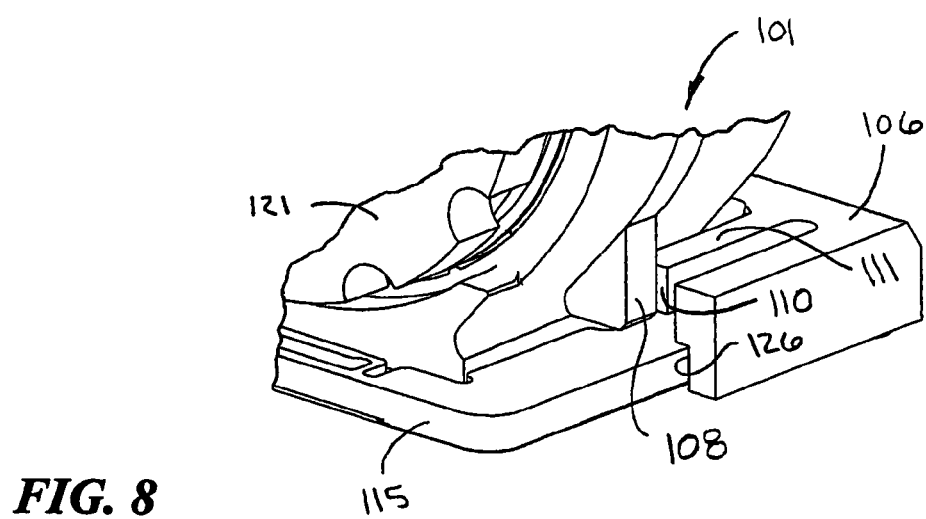
FIG. 8 is an enlarged fragmentary perspective view of the optics assembly and one snubber of FIG. 7, with one axial snubber removed to better show the stop of the optics assembly.

Referring now to FIG. 8, optical assembly 101 is attached to stage 41 (FIGS. 5 and 9) of stage and lateral snubber assembly 115 (best shown in FIG. 1) such that axial movement of optical assembly 101 is restricted by the cooperation of a protrusion 108 (that is formed upon optical assembly 101) with axial snubbers 105 and 106 (that are attached to stage and lateral snubber assembly 115). Protrusion 108 restricts movement of optical assembly 101 when protrusion 108 abuts an abutment surface 110 of motion limiting member 111 of a snubber 105, 106. Thus, protrusion 108 can move back-and-forth within a gap, Dimension J of FIG. 10, defined by motion limiting members 111. The range of motion of optics assembly 101 is determined by a gap, Dimension I of FIG. 10, between protrusion 108 and abutment surface 110 of either motion limiting member 105, 106.

Figure 10:
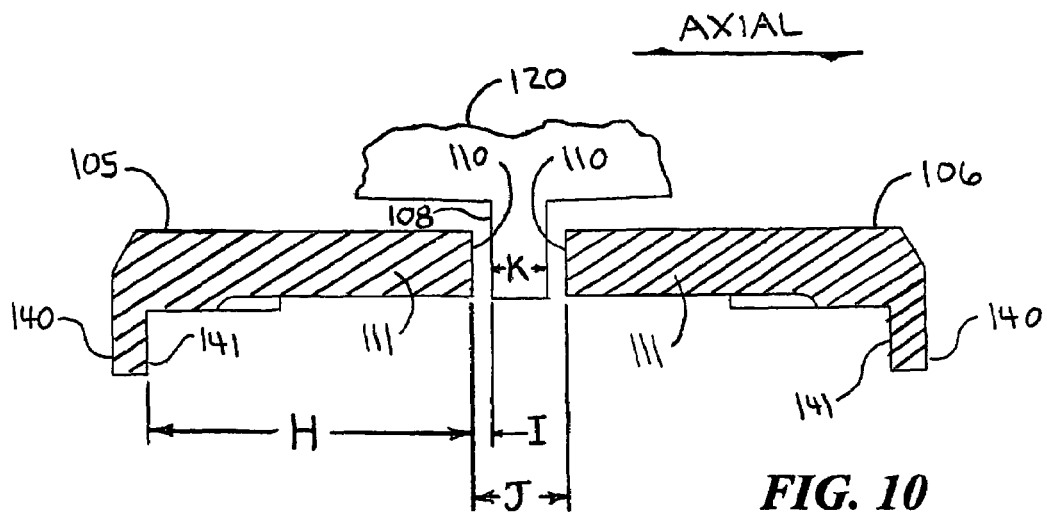
FIG. 10 is a cross-sectional side view of the axial snubber and a portion of the optics assembly (the protrusion thereof) of FIGS. 7 and 8.

Although only the gap on one side of protrusion 108 is indicated as being Dimension I in FIG. 10, those skilled in the art will appreciate that the gaps on both sides of protrusion 108 can be so designated. Typically, the gaps (corresponding to Dimension I) on both sides of protrusion 108 will be approximately equal in length. However, the present invention can be configured such that the gaps (corresponding to Dimension I) on each side of protrusion 108 have different lengths with respect to one another. Thus, an item such as optics assembly 101 can have different amounts of travel forward and backward with respect to its home or unactuated position.

Figure 9:
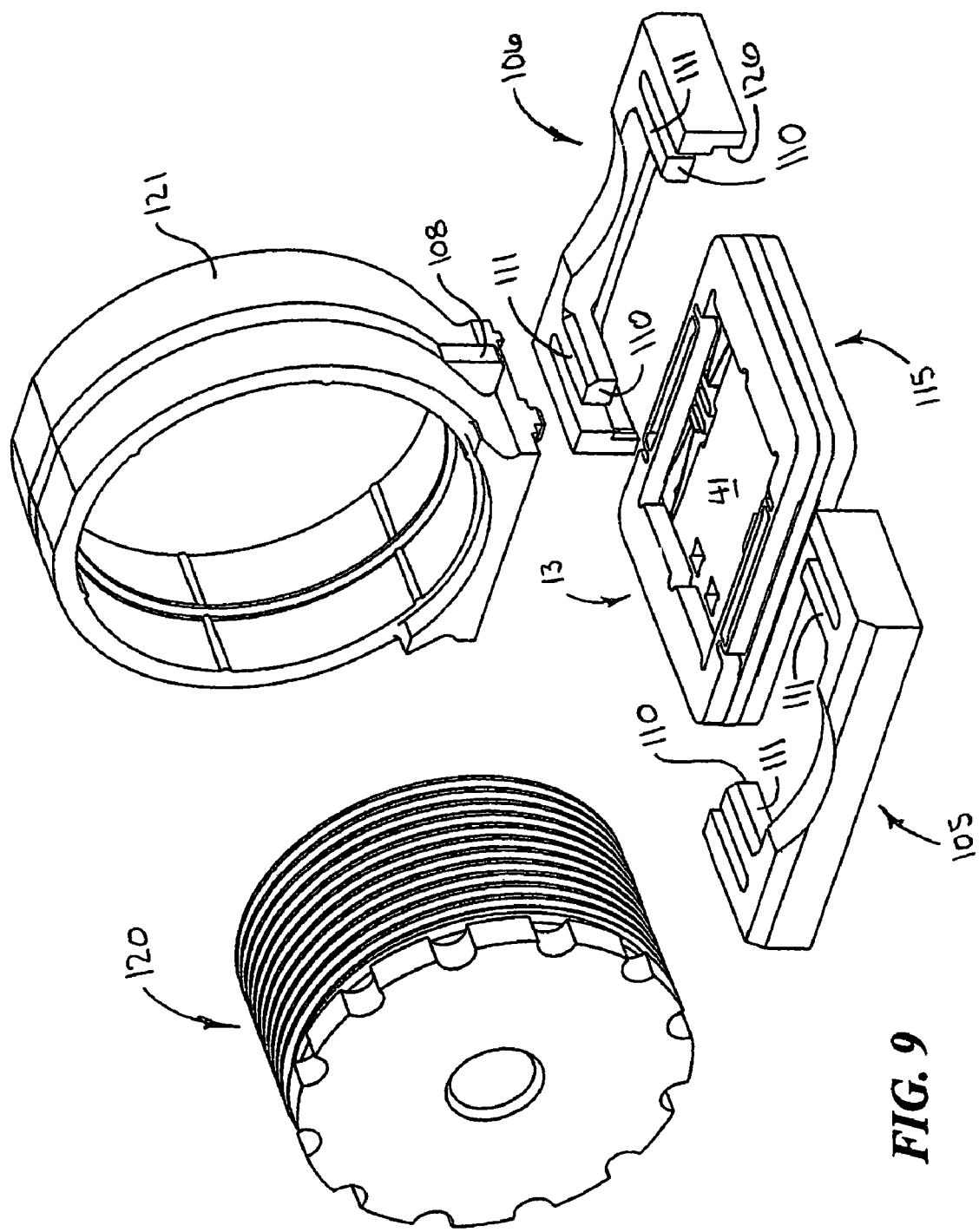
FIG. 9 is and exploded view of the optics assembly, axial snubbers, the stage, and the lateral snubber assembly of FIGS. 7 and 8.

Referring now to FIG. 9, the relationship between axial snubbers 105, 106 and stage and lateral snubber assembly 115 can be better appreciated. Axial snubbers 105 and 106 generally surround an upper portion of stage and lateral snubber assembly 115. During assembly, axial snubbers 105, 106 can be slid over stage and lateral snubber assembly 115 and attached thereto, providing the configuration shown in FIGS. 7 and 8. Axial snubbers 105 and 106 can be attached to stage and lateral snubber assembly 115 via adhesive bonding, ultrasonic welding, an interference fit, the use of fasteners, or by any other desired method.

A cutout, groove, or channel 126 (best shown in FIG. 11) can be formed in each axial snubber 105, 106 to better facilitate positioning thereof upon stage and lateral snubber assembly 115. Detents 127 (FIG. 11) can optionally be formed in or proximate channel 126 to provide an interference fit of axial snubber 105, 106 to stage and lateral snubber assembly 115. That is, detents 127 can snap into corresponding recesses (not shown) or behind corresponding detents (not shown) formed in stage and lateral snubber assembly 115 when axial snubbers 105 and 106 are positioned properly with respect thereto.

Referring now to FIG. 10, the motion limiting effect of motion limiting members 111 with respect to protrusion 108 is shown. It can easily be seen that as optics assembly 101 moves back-and-forth axially, protrusion 108 thereof abuts abutment surfaces 110 of axial snubbers 105, 106. In this manner, axial movement of optics assembly 101 is limited to the distance of the gap of Dimension I in either axial direction. The size of the gap, Dimension I, is determined by the length of position limiting members, Dimension H, as well as the thickness, Dimension K, of protrusion 108.

It is worthwhile to appreciate that proper definition of the gap, Dimension I, is dependent upon proper placement of positioning surface 141 of each axial snubber 105, 106. Positioning surface 141 is formed so as to mate with stage and lateral snubber assembly 115 such that its position is precisely defined, thus likewise precisely defining the position of abutment surfaces 110 of axial snubbers 105, 106. Thus, positioning surface 141 facilitates the alignment of abutment surfaces 110.

Figure 11:
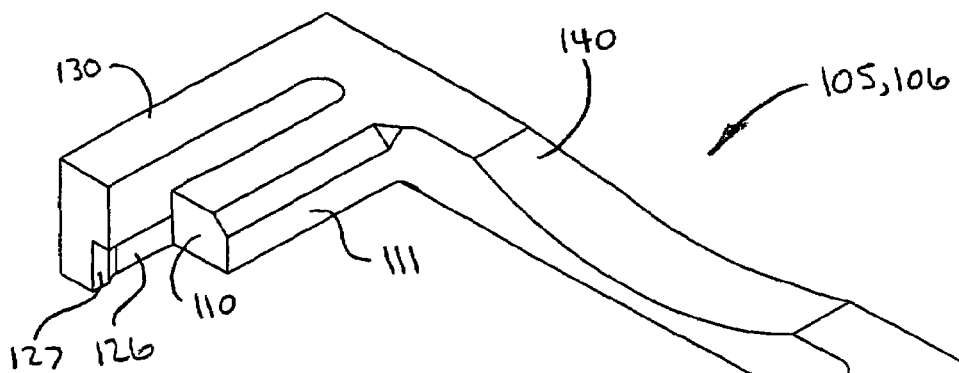
FIG. 11 is a perspective view of one axial snubber (both axial snubbers can be identical) of FIGS. 7-10.

Referring now to FIG. 11, according to one exemplary embodiment of the present invention, axial snubbers 105, 106 comprise a generally U-shaped structure having a base 140 and outwardly extending members 130. Inboard with respect to the two outwardly extending members 130 are motion limiting members 110.

Axial snubbers 105, 106 can be formed of a resilient and durable polymer material. Axial snubbers 105, 106 can alternatively be formed of another material, such as silicone rubber, polycarbonate, or metal. Desired resiliency can be inherent to the material itself or can be a consequence of the particular configuration of the material. For example, a metal such as steel can be configured such that motion limiting members 111 define springs, such as coiled compression springs.

Indeed, axial snubbers 105, 106 do not necessarily comprise a single material, but rather may be formed of a plurality of materials. For example, base 140 and outwardly extending members 130 can comprise a more rigid material, such as a metal, while motion limiting members 111 can comprise a more resilient material, such as silicone rubber.

Axial snubbers 105, 106 can be formed via molding, such as injection molding of a polymer material. Alternatively, axial snubber 105, 106 can be formed via machining, such as ion milling or laser ablation of silicon or a metal.

According to at least one embodiment of the present invention, motion of an item, such as camera optics, is limited to a desired range that is consistent with desired operation thereof. Optionally, limits on the motion of the item can define significant operational points in the position thereof. For example, one limit on the motion of camera optics can be focus at infinity. Such configuration can simplify positioning of the item. For focusing a camera at infinity, it is thus merely necessary to drive the optics to one extreme position. This extreme position can also define a known starting point for further positioning.

Snubbers 105 and 016 can be configured so as to provide any desired range on the motion of the optics. Thus, focus at infinity is by way of example only and not by way of limitation. For example, the farthest focus could alternatively be at twenty feet, ten feet, five feet, or any other desired distance. Similarly, snubbers 105 and 105 can be configured such that the closes focus is at any desired distance. Thus, the closest focus can be at ten feet, five feet, eighteen inches, twelve inches, four inches, or any macro distance, for example.

Excessive travel of the item is inhibited, so as to mitigate damage. For example, if stage 41 is formed of silicon, then excessive movement thereof could result in damage thereto due to the comparatively brittle and fragile nature of silicon. By restricting its movement to a desired range, such damage is mitigated.

The snubbers of the present invention can absorb shock while plasticly deforming substantially. Yet, the snubbers can return to their original configuration such that the limits that they impose on the travel of the camera optics is repeatable.

Although the axial snubber assembly is described herein as being suitable for controlling the motion of a stage that supports the optics of a camera, those skilled in the art will appreciate that the stage can similarly be used to support other items. For example, the stage can alternatively be used to position a specimen for viewing under a microscope or for other analysis. Thus, discussion of the invention herein as being useful for positioning the optics of a camera is by way of example only, and not by way of limitation.

Embodiments described above illustrate, but do not limit, the invention. It should also be understood that numerous modifications and variations are possible in accordance with the principles of the present invention. Accordingly, the scope of the invention is defined only by the following claims.

The invention claimed is:

1. An axial snubber for limiting motion of camera optics along an optical axis of the camera optics, the axial snubber comprising:
   an elongated U-shaped positioning member abutting a fixed structure to which the camera optics are mounted; and,
   a pair of motion limiting members extending from the positioning member and respectively disposed on opposite sides of the camera optics so as to limit the motion of the camera optics along the optical axis thereof;
   wherein the motion limiting members are configured to at least partially define a first range of motion of the camera optics under normal operating conditions; and,
   wherein the motion limiting members are configured to at least partially define a second range of motion of the camera optics under shock.

2. The axial snubber as recited in claim 1, wherein the first range of motion is at least partially defined by the motion limiting members when disposed in a non-deformed state.

3. The axial snubber as recited in claim 1, wherein the second range of motion is at least partially defined by the motion limiting members when disposed in a deformed state.

4. The axial snubber as recited in claim 1, wherein the second range of motion is at least partially defined by the motion limiting members when disposed in an elastically deformed state.

5. The axial snubber as recited in claim 1, wherein the positioning member and the motion limiting members are formed of a polymer material.

6. The axial snubber as recited in claim 1, wherein the positioning member and the motion limiting members are formed by molding a polymer material.

7. The axial snubber as recited in claim 1, wherein the motion limiting members are formed of silicon rubber.

8. The axial snubber as recited in claim 1, wherein the positioning member and the motion limiting members are formed of silicon.

9. The axial snubber as recited in claim 1, wherein the positioning member and the motion limiting members are formed by etching silicon.

10. The axial snubber as recited in claim 1, wherein the positioning member and the motion limiting members are formed by milling silicon.

11. The axial snubber as recited in claim 1, wherein the motion limiting members define position of the camera optics for focus at infinity.

12. The axial snubber as recited in claim 1, wherein the motion limiting members define a position of the camera optics for macro focus.

* * * * *